United States Patent [19]
Baker et al.

[11] Patent Number: 5,551,169
[45] Date of Patent: Sep. 3, 1996

[54] AIR VELOCITY CONTROL FOR EFFICIENT PRODUCT TEMPERATURE CYCLING

[75] Inventor: Richard L. Baker, deceased, late of San Clemente, by Betty A. Baker, executrix; Robert H. Weinmann, Jr., Laguna Hills, all of Calif.

[73] Assignee: Screening Systems, Inc., Laguna Hills, Calif.

[21] Appl. No.: 315,029

[22] Filed: Sep. 28, 1994

Related U.S. Application Data

[63] Continuation of Ser. No. 848,633, Mar. 9, 1992, abandoned.

[51] Int. Cl.⁶ ........................................ F26B 3/00
[52] U.S. Cl. ........................ 34/491; 34/487; 236/91 A
[58] Field of Search ..................... 126/247; 237/1 R, 237/11; 236/91 A; 34/487, 488, 492, 491

[56] References Cited

U.S. PATENT DOCUMENTS 3,467,179  9/1969  Tevis et al. ..................... 126/247 X
3,807,383  4/1974  Lawler ............................ 126/247

*Primary Examiner*—Henry A. Bennett
*Assistant Examiner*—Dinnatia Doster
*Attorney, Agent, or Firm*—Blakely, Sokoloff, Taylor & Zafman

[57] ABSTRACT

The temperature of air to heat or cool a product (16, 18) is maintained constant at levels which respectively are substantially higher or lower than the goal temperatures at which the respective products are to be stressed. Controllers (68, 70) having temperature/time profiles (72, 74) control the velocity of this higher or lower temperature air, as supplied by closed loops (20, 22) from high and low temperature sources (24, 26) to the products in their environmental stress chambers (12, 14), or bypassed through bypass conduits (50, 52) to maintain or change the temperatures of the products. High and low temperature sources (24, 26) and the product stress chambers (12, 14) may be interconnected by a cross-over arrangement of branches (80, 82, 84 and 86) to economize energy for heating or cooling the air, and to enable both environmental chambers (12, 14) to be interchangeably used for stress heating or cooling and, thus, to avoid movement of a product for the same purpose.

10 Claims, 1 Drawing Sheet

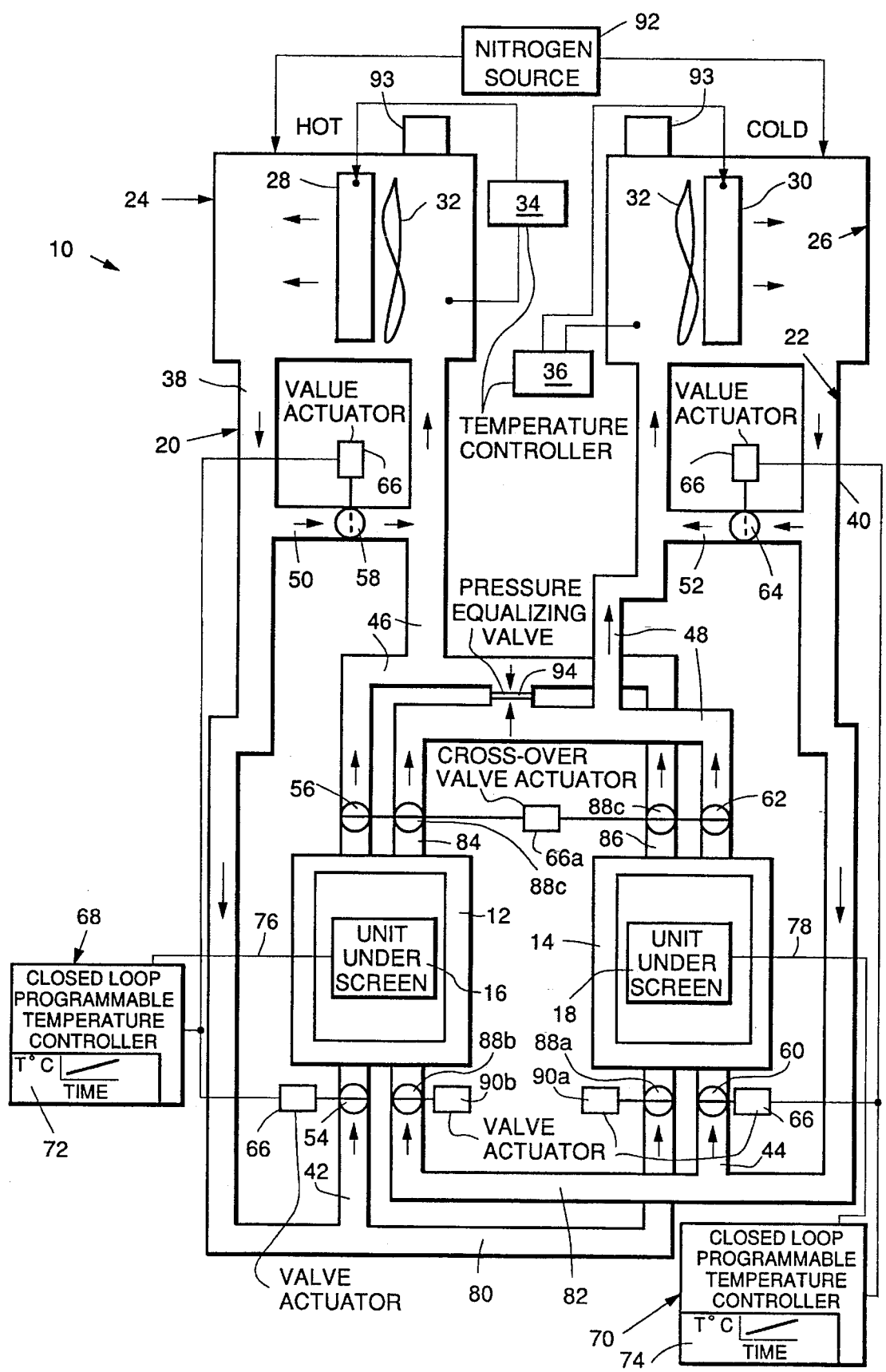

AIR VELOCITY CONTROL FOR EFFICIENT PRODUCT TEMPERATURE CYCLING

This is a continuation application Ser. No. 07/848,633, filed Mar. 9, 1992, abandoned.

BACKGROUND OF THE INVENTION

1. Field of the Invention

The present invention relates to apparatus and a method for controlling temperatures within an enclosure and, more particularly, for using the velocity of heated and/or cooled fluid as the temperature controlling means.

2. Description of Related Art and Other Considerations

Stress screening of a product is associated with vibrating the product under conditions which enables any defects, which may be a result of the manufacturing process, to be found. In this way, devices or products, which have defects caused by variations in fabrication processes or workmanship, may be screened out of the production line before being shipped to a customer. Examples of vibration stress screening apparatus is disclosed in U.S. Pat. Nos. 4,181,025 through 4,181,029 and 4,735,089.

Environmental screening many times also includes the application of heat and/or cold to the product. This is the other major form of stress which helps the process of finding defects. In a typical method for thermal screening, the product is placed in an environmental control chamber whose temperature is ramped up and down to allow time for the temperature or temperatures of the product to attain the specified temperature limits. Such a stress screening temperature chamber is illustrated and described in a paper entitled "Stress Screening of Electronic Modules" published in the *JOURNAL OF THE IES,* March/April, 1990 on pages 60–65.

Such conventional temperature screening as described in the above publication is subject to several disadvantages. Heating or cooling of the product is slow, because of the relatively small temperature differential between the heating or cooling air and the product, and the poor heat transfer because, even when air is circulated within the chamber, the velocity of the air is low. Another problem is that, towards the end of the heating or cooling cycle where the temperature of the product approaches the air temperature, there is an increasing time interval for the product to attain its goal temperature. This slowing down is caused by the decreasing temperature differential between the air and the product; thus, the heat flow decreases almost to zero as the temperature difference between the product and the air decreases towards zero. Further, energy usage is inefficient because of the heating and cooling process of the recycled air and of the chamber itself. In addition to achieving the minimum and maximum temperatures, for effective stress to be generated within a product using a heating and/or cooling fluid, the temperature of the product must be made to change rapidly. In order to compensate for such problems as above discussed, large and expensive air conditioning installations are required. Accordingly, because of such high cost and long screening times involved with conventional temperature screening processes, most commercial manufacturers screen only with vibration; to combine heating with vibration many times is not an economical option.

SUMMARY OF THE INVENTION

These and other problems are successfully addressed and overcome by the present invention. The temperature of the heating or cooling air or other suitable fluid is maintained at a generally constant temperature which is substantially higher or lower than the goal temperature at which the product is to be heated or cooled. This higher or lower temperature air is supplied to the product in a closed loop at high velocities, and the velocities of the air in the closed loop is varied to control the heating or cooling of the product.

When a pair of closed loops for respective heating and cooling are used, a cross-over connection between the loops may be used for subjecting a product to successive heating and cooling without need to transfer the product from a chamber in one loop to another chamber in the other loop, and for enabling exhaust fluid to be directed to the cooling or heating air source which is closer to the temperature of the exhaust air regardless of the source originally heating or cooling the air.

Several advantages are derived from this arrangement. The large temperature difference to be maintained between the air and the product within the enclosure avoids problems of decreasing heat flow between the air and the product, and results in rapid temperature changes in the product within a period of time which is shorter than that obtainable in conventional temperature ramping. The high velocity of the air also produces improved heat transfer of heat to or from the product during its respective heating or cooling. As a result, a more rapid temperature change is obtainable than previously possible. Air conditioning sources need only be sized sufficiently large to handle the heat load of the product and the small surrounding enclosure. This results in the application of rapid temperature ramp rates using conventional electric heating and minimum sized mechanical refrigeration, or other cooling methods. Energy efficiency is increased because the thermal energy need not be expended to continually heat and then cool and then heat again the large volume of air within a conventional chamber. The efficiency obtained through energy temperature cycling increases the effectiveness and use of thermal screening.

Other aims and advantages, as well as a more complete understanding of the present invention, will appear from the following explanation of an exemplary embodiment and the accompanying drawing thereof.

BRIEF DESCRIPTION OF THE DRAWING

The sole FIGURE diagrammatically depicts a preferred embodiment of the present invention.

DETAILED DESCRIPTION OF THE PREFERRED EMBODIMENT

A system 10 includes two chambers 12 and 14 for thermally screening a pair of units 16 and 18 in a temperature environment. While it is possible to combine a system 10 with a vibration screening apparatus such as disclosed in above-identified U.S. Pat. Nos. 4,181,025 through 4,181,029 and 4,735,089, it is preferred both for the sake of reduction in complexity and attendant costs thereof as well as of flexibility in use, to utilize a separate thermal system 10 rather than combining it with the aforementioned apparatus. It is to be understood, however, that the individual use or combination of the two vibration and thermal environmental screening systems is the choice of the end user and that user's needs. However, when the vibration screening system such as described in the above patents and the thermal screening system of the present invention are utilized separately, they can be placed in an assembly line to permit a unit under screen to be first carried into a vibration screening assembly and thereafter to be moved into one or both thermal environmental chambers 12 and 14 for thermal screening.

As shown, thermal screening system 10 comprises a pair of closed loops 20 and 22, respectively for each environmental chamber 12 and 14. Closed loop 20 couples chamber 12 to a source 24 of hot air or other suitable heating fluid. Chamber 14 is coupled by its loop 22 to a source 26 of refrigerant air or other suitable cooling fluid. The source of hot air in hot air source 24 may be by any suitable means, such as a heater 28 of conventional construction. In a like manner, a refrigeration unit 30 provides cooling in the cold air source. Suitable motor driven fans as generally illustrated by blades 32 force air through respective heater unit 28 and refrigeration unit 30. Temperature controllers 34 and 36 are coupled respectively to heater unit 28 and refrigeration unit 30 to insure that the selected temperatures of their units are kept to a selected or given temperature which is greater than the temperature which is desired for units 16 and 18. To insure rapid heating or cooling of units 16 and 18, it is preferred that the temperatures produced by units 28 and 30 be respectively 20° C. higher or lower for heating of unit 16 or cooling of unit 18; however, these temperature differentials are given only as examples and, therefore, for purposes of illustration. A greater or lesser differential may be used if the desired rapid heating or cooling of the unit is produced.

Heating closed loop 20 and cooling closed loop 22 respectively include fluid supply paths 38 and 40 which are respectively coupled to beating environmental chamber 12 through a conduit 42 and cooling environmental chamber 14 through a conduit 44. The return from the respective chambers 12 and 14 are through heater exhaust conduit 46 and cooling exhaust conduit 48, which close their respective loops 38 and 40 to respective environmental chambers 12 and 14.

Each closed loop includes a bypass conduit 50 and 52, respectively for closed loop 20 and 22. Valves 54, 56 and 58 are positioned in respective conduits 42, 46 and 50 in order to vary the amount of heated air passing within closed loop 20. In a like manner, valves 60, 62 and 64 are placed respectively in conduits 44, 48 and 52 for use in cooling closed loop 22. The respective valves are operated by their own valve actuators 66 and 66a. Actuators 66 only for valves 54 and 58 are electrically coupled to a closed loop programmable temperature controller 68. In a like manner, valve actuators 66 for only valves 60 and 64 are electrically coupled to a closed loop programmable temperature controller 70. Controllers 68 and 70 include high and low temperature/time profiles 72 and 74 respectively. Controller 68 is provided with a temperature sensing coupling 76 to unit 16 while controller 70 is provided with a temperature sensing coupling 78 to unit 18. Controllers 68 and 70 may be manually or automatically controlled, e.g., by use of conventional B 5 mechanisms and software programs. Temperature sensing by both couplings 76 and 78 is also provided by conventional means, such as by thermocouples. As a result of the temperature sensing couplings to respective units 16 and 18, a comparison can be made in respective controllers 68 and 70 with respective temperature/time profiles 72 and 74 to control the amount of air being supplied through conduits 42 and 44 to chambers 12 and 14 or through bypass conduits 50 and 52.

Closed loops 20 and 22 can also be connected to one another through a cross-over arrangement. This cross-over arrangement includes a branch conduit 80 from heating air supply path 38 to cooling environmental chamber 14. Likewise, a branch conduit 82 is extended from cooling air supply path 40 to heating environmental chamber 12. On the exhaust sides of the environmental chambers, a branch conduit 84 extends from heating environmental chamber 12 to cooling exhaust conduit 48, while a branch conduit 86 extends from cooling environmental chamber 14 to exhaust conduit 46. Appropriate valves 88a, 88b and 88c are positioned in branch conduits 80, 82, 84 and 86 and are operated by valve actuators 90a, 90b and 66a, the latter operating also to actuate valves 56 and 62.

Operation of valve actuator 66a for valves 56, 62 and 88c is so correlated to provide maximum energy efficiency and utilization. Specifically, exhaust cross-over logic controls cross-over valve actuator 66a to direct the return air from chambers 12 and 14 to either hot air source 24 or cold air source 26, the selection being dependent upon which one is closest in temperature to the air or other fluid being exhausted from the chamber. Such cross-over logic is based upon the use of both chambers being 180° out of phase from one another, and the use of a sensor for controlling all cross-over exhaust valves 56, 62 and 88c. This sensor compares the return or exhaust air temperature with the ambient air temperature and, if higher, the exhaust air is directed to heat source return line 46 and, if colder than the ambient, the exhaust is directed to cold source return line 48. Further, if unit 16 and/or unit 18 must be both heated and cooled for temperature stressing, it is simpler to redirect the heating and the cooling air rather than to move the unit. Thus, this cross-over networking will conserve energy.

A nitrogen source 92 is further provided in order to inject dry nitrogen gas into the air stream of both conditioner halves to make up for cross-over or lost air, and to control the dew point in order to eliminate condensation in the total system package. Check valve vents 93 are coupled to each source 24 and 26 for discharge of humid fluid from system 10 when the dry nitrogen gas is introduced therein.

The operation on the heating side utilizing closed loop 20 is illustrative of the use of the present invention. Unit 16 is placed within environmental chamber 12 which is then closed and sealed. Controller 68 is set so that its temperature/time profile 72 will provide the requisite thermal stress to be applied to unit 16. Heater 28 is also energized, with temperature controller 34 being set to provide a desired temperature minimally 20° C. higher than the maximum temperature at which unit 16 is to be stressed. Fan 32 is energized, valve 58 within bypass conduit 50 is closed, and valves 54 and 56 are opened so that air will pass from source 24 through chamber 12 and over unit 16 to be placed under screen. Fan 32 is operated at a relatively high velocity, for example, at 20 feet per second, so that air will pass and flow through unit 16 in order to rapidly increase its temperature. It is to be understood, however, that a greater or lesser velocity of air may be selected, as suitable for the desired cooling or heating and depending upon the product being screened. This temperature is sensed through temperature sensing coupling 76 and then fed back into controller 68 which compares the sensed temperature with profile 72. At such time as temperature of unit 16 attains its desired point, controller 68 then closes valves 54 and 56 and opens valve 58 so that air will bypass environmental chamber 12 and flow in a circuitous route through bypass conduit 50. When the temperature of unit 16 decreases to a set level, controller 68 will through adjustment of valves 54, 56 and 58 permit a greater or lesser amount of air to flow through unit 16. Thus, unit 16 is maintained at a particular temperature.

When the screen requires a temperature cycling of unit 16, profile 72 within controller 68 may be varied to ramp the temperatures and the velocity of the air up and/or down on unit 16 by a simple manipulation of valves 54, 56 and 58.

Use of cooling chamber 14 and its valving and closed loop 22 with cooling air supply 26 is operated in a similar manner. A spring-loaded pressure equalizing valve 94 ties the two closed loops 20 and 22 together. Valve 94 performs pressure equalization by venting the loop with the higher pressure into the loop with the lower pressure.

Further, in the operation of the present invention, one or both, heating or cooling, environments may be provided at separate or simultaneous times for different units 16 and 18 under screen. Maximum efficiency may be achieved by maintaining a phase difference of 180° between profile 72 and profile 74. When unit 16 is at its maximum hot temperature, unit 18 would be at its maximum cold temperature. In addition, as indicated above, the use of branch conduits 80 through 86, and their associated valves and valve actuators, units 16 and 18 may be subjected to cooling and heating from sources 26 and 24. While environmental chamber 12, for example, in the preceding description has been described as being a heating environmental chamber, branch conduits 80–86 may couple environmental chamber 12 to refrigeration or cooling supply 26, rather than to heating supply 24. Therefore, unit 16 may be first subjected to high temperature stressing followed by low temperature stressing, without need to remove this unit from its chamber. Similarly, unit 18 may be afforded a similar cooling and heating in its chamber 14.

Further, in addition to proportional valves 54, 58, 60, 64, 88a and 88b, all of which are used to modulate the air velocity to chambers 12 and 14, either or both fans 32 in chambers 24 and 26 may be regulated to increase or decrease the velocity of the air or other heating or cooling fluids. This increase or decrease in temperature, as controlled by the velocity of the heating and cooling air, will enable the heating time or cooling time for the unit under test to be varied. This may be useful where thermal stressing must be gradual or very rapid. Thus, a particular unit under screen may be thermally shocked.

In an experiment, using a constant air temperature of 100° C. and an air velocity of 27 feet per second, the temperature rate of change for light and medium mass electronic components mounted on a circuit board was found to be 50° C. per minute. By manually changing the positions of the bypass and supply valve openings in 5 second steps, this ramp was made to be almost perfectly linear.

Although the invention has been described with respect to a particular embodiment thereof, it should be realized that various changes and modifications may be made therein without departing from the spirit and scope of the invention.

What is claimed is:

1. Thermal screening apparatus for rapidly imparting relatively high and low temperatures changes to one or more items comprising:

first and second closed looped means;

means for providing first and second fluids at first and second selected high and low temperatures substantially higher and lower respectively than a desired temperature for the item:

first and second means for selectively passing said first and second fluids over the item; and first and second means for controlling the velocities of the first or second fluid passed over the item for rapidly imparting the high or low temperature thereto.

2. Apparatus according to claim 1 further comprising cross over conduit means coupling said first and second closed loop means, and cross-over valve means in said cross-over conduit means for adjusting flow of the respective fluids between said first and second loops.

3. Apparatus according to claim 2 further comprising cross-over actuator means coupled to said cross-over valve means for adjusting the flow of the respective first and second means fluids between said first and second loops.

4. Apparatus according to claim 3 in which said first and second controller means respectively include means for defining desired high and low temperature profiles for the item, and means for sensing the temperature of the item and for comparing the sensed temperature with the temperature profile.

5. A method for rapidly imparting successive relatively high temperature increases and decreases to an item comprising the steps of:

selectively passing over the item first and second fluids having selected first and second temperatures which are respectively substantially higher and lower than desired temperatures of the item; and imparting different velocities of the relevant fluid passed over the item for rapidly imparting the high or low temperature changes thereto.

6. A method according to claim 5 further comprising the steps of:

coupling a source of the first or second fluid to the item through a closed loop;

bypassing the item through a conduit in the loop; and varying the velocity of the fluid passing over the item by valving the loop and the conduit.

7. A method according to claim 6 further comprising the step of coupling controller means respectively to the valving in the respective loops for varying the velocity of the relevant fluid passing over the item.

8. A method according to claim 7 further comprising the step of providing cross-over conduit means and cross-over valve means for adjusting the flow of the respective fluids between the first and second loops.

9. A method according to claim 8 further comprising the steps of providing desired high and low temperature profiles for the item, and sensing the temperature of the item and for comparing the sensed temperature with the relevant temperature profile.

10. Apparatus for rapidly imparting a desired temperature change to an item comprising:

means for providing a fluid at a selected temperature, which selected temperature is substantially higher or lower than a desired temperature for the item;

closed loop means for providing a fluid flow path from said fluid providing means to said item and return;

means for circulating said fluid through said closed loop at a high velocity of up to 20 ft per second;

means for sensing a current temperature of the item to provide a sensed temperature; and means responsive to said sensed temperature for controlling and varying the velocity of the fluid passed over the to provide a temperature change for said item of up to substantially at least 50° C. in a minute.

* * * * *

UNITED STATES PATENT AND TRADEMARK OFFICE
CERTIFICATE OF CORRECTION

PATENT NO.  : 5,551,169
DATED       : September 3, 1996
INVENTOR(S) : Baker et al.

It is certified that error appears in the above-identified patent and that said Letters Patent is hereby corrected as shown below:

In column 3 at line 29, please delete " beating " and insert -- heating --.

Signed and Sealed this

Twenty-eighth Day of October, 1997

Attest:

BRUCE LEHMAN

*Attesting Officer*             *Commissioner of Patents and Trademarks*